(12) United States Patent
Nakatsugawa

(10) Patent No.: US 10,374,875 B2
(45) Date of Patent: Aug. 6, 2019

(54) RESOURCE MANAGEMENT DEVICE, RESOURCE MANAGEMENT SYSTEM, AND COMPUTER-READABLE RECORDING MEDIUM

(71) Applicant: FUJITSU LIMITED, Kawasaki-shi, Kanagawa (JP)

(72) Inventor: Keiichi Nakatsugawa, Shinagawa (JP)

(73) Assignee: FUJITSU LIMITED, Kawasaki (JP)

(*) Notice: Subject to any disclaimer, the term of this patent is extended or adjusted under 35 U.S.C. 154(b) by 23 days.

(21) Appl. No.: 15/428,424

(22) Filed: Feb. 9, 2017

(65) Prior Publication Data
US 2017/0257267 A1 Sep. 7, 2017

(30) Foreign Application Priority Data
Mar. 2, 2016 (JP) .................................. 2016-040128

(51) Int. Cl.
| G06F 15/173 | (2006.01) |
| H04L 12/24 | (2006.01) |
| H04L 12/46 | (2006.01) |

(52) U.S. Cl.
CPC ...... H04L 41/0806 (2013.01); H04L 12/4641 (2013.01); H04L 41/20 (2013.01)

(58) Field of Classification Search
CPC .............. G06F 9/5027; G06F 9/5044; G06F 2209/485; G06F 9/5061; H04L 65/80; H04L 67/10
See application file for complete search history.

(56) References Cited

U.S. PATENT DOCUMENTS

| 6,968,441 B1* | 11/2005 | Schnee ................. G06F 9/5016 711/173 |
| 7,328,263 B1* | 2/2008 | Sadjadi .................... G06F 9/526 707/999.008 |
| 2003/0046396 A1* | 3/2003 | Richter .................... G06F 9/505 709/226 |
| 2009/0064159 A1* | 3/2009 | LaFrese ................ G06F 3/0613 718/104 |
| 2012/0233613 A1* | 9/2012 | Shimogawa ........ G06F 9/45558 718/1 |

(Continued)

FOREIGN PATENT DOCUMENTS

| JP | 10-78931 | 3/1998 |
| JP | 2012-190109 | 10/2012 |

Primary Examiner — Suraj M Joshi
Assistant Examiner — Ayele F Woldemariam
(74) Attorney, Agent, or Firm — Staas & Halsey LLP

(57) ABSTRACT

A resource management device provides a communication service in a network in response to a service request. The resource management device includes a processor. The processor executes a process. The process includes converting a total resource amount in the network into a first value. The process includes assigning a second value to each type of the communication service from the first value. The process includes second converting a resource requesting amount of the service request into a third value. The process includes setting, determining that the third value is equal to or less than the second value that is assigned to the type of the communication service of the service request, a communication service associated with the service request for a communication device on the network.

5 Claims, 12 Drawing Sheets

(56) References Cited

U.S. PATENT DOCUMENTS

2013/0072146 A1\* 3/2013 Smith ..................... H04W 4/22
455/404
2016/0156568 A1\* 6/2016 Naganuma .............. H04L 47/70
709/226

\* cited by examiner

FIG.5

| LAYER ID | RESOURCE ID | TOTAL NUMBER | QUANTITY OF ASSIGNMENT CANDIDATES | RQ |
|---|---|---|---|---|
| OpenFlow/ NFV | PORT (1G) | 18 | 12 | 12 |
| | VM (GENERAL-PURPOSE SV) | 6 | 6 | 6 |
| IP/Ether | PORT (1G) | 24 | 12 | 12 |
| MPLS | PORT (1G) | 12 | 6 | 6 |
| | PORT (10G) | 3 | 0 | 0 |
| OTN/WDM | PORT (10G) | 11 | 4 (10G PORT) | 40 |
| | ODU PATH (100G) | 2 | 2 | 200 |
| | ODU PATH (10G) | 1 | 1 | 10 |
| TOTAL RQ AMOUNT | | | | 286 |

| USE RESOURCE | QUANTITY | RQ |
|---|---|---|
| PE PORT (10G) | 2 | 20 |
| BAND (FIXED) | 10G | 10 |
| RQC | | 30 |

| USE RESOURCE | QUANTITY | RQ |
|---|---|---|
| PE PORT (1G) | 2 | 2 |
| BAND (AVERAGE) | 0.5G | 0.5 |
| RQC | | 2.5 |

RESOURCE MANAGEMENT DEVICE, RESOURCE MANAGEMENT SYSTEM, AND COMPUTER-READABLE RECORDING MEDIUM

CROSS-REFERENCE TO RELATED APPLICATION

This application is based upon and claims the benefit of priority of the prior Japanese Patent Application No. 2016-040128, filed on Mar. 2, 2016, the entire contents of which are incorporated herein by reference.

FIELD

The embodiment discussed herein is related to a resource management device, a resource management system, and a computer-readable recording medium.

BACKGROUND

Recently, there is known a Software-Defined Networking (SDN) that can cause a controller to automatically and rapidly control resource setting of a NetWork (NW) in accordance with an NW use request of a user, a use situation of the NW, etc. The SDN controller dynamically assigns resources on demand in accordance with a service request of a user for a communication service to provide the communication service to the user by using the resources. Moreover, when the communication service for the user is terminated, the SDN controller releases the resources at once, and assigns the unoccupied resources to another user. As a result, the SDN can improve the use efficiency of resources, and thus, the facility cost and the operational cost can be reduced.

Moreover, recently, a Virtual Network Operator (VNO) or a Mobile Virtual Network Operator (MVNO) increases, which borrows an NW facility from a network operator or a mobile network operator to provide a communication service to a user. For example, when a Network Service Provider (NSP) borrows an optical access line from a network operator having an optical access network, the NSP can provide, as a VNO, an optical access line service to a user. On the other hand, when an NSP borrows a wireless communication facility from a mobile network operator having a mobile phone network, the NSP can provide, as an MVNO, a mobile communication service to a user.

Hereafter, an NSP increases, which borrows resources from a network operator employing an SDN technology. An SDN controller fixedly assigns resources in an NW to the NSP. As a result, the NSP can provide a communication service to a user of the NSP by using the resources borrowed from the network operator.

Patent Literature 1: Japanese Laid-open Patent Publication No. 10-078931
Patent Literature 2: Japanese Laid-open Patent Publication No. 2012-190109

However, because the SDN controller fixedly assigns a resource in an NW to each NSP, the resource in the NW is not be shared between the NSPs, and thus the use efficiency of the resource is not sufficient.

SUMMARY

According to an aspect of an embodiment, a resource management device includes a processor, wherein the processor executes a process. The process includes first converting a total resource amount in the network into a first value. The process includes assigning a second value to each type of the communication service from the first value. The process includes second converting a resource requesting amount of the service request into a third value. The process includes setting, determining that the third value is equal to or less than the second value that is assigned to the type of the communication service of the service request, a communication service associated with the service request for a communication device on the network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating one example of RQs of respective resources for each layer;

DESCRIPTION OF EMBODIMENT

Preferred embodiments of the present invention will be explained with reference to accompanying drawings. In addition, the disclosed technology is not limited to the embodiment described below. Moreover, this embodiment may be appropriately combined within a consistent range.

Figure 1:
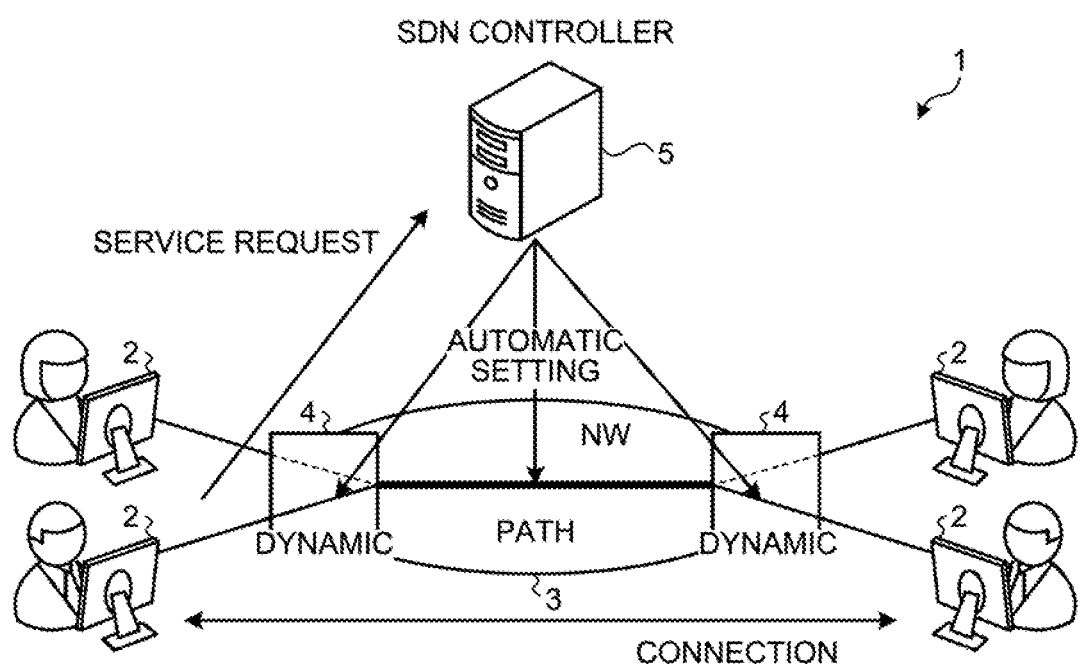
FIG. 1 is a diagram illustrating one example of an SDN system according to a present embodiment.

FIG. 1 is a diagram illustrating one example of an SDN system 1 according to the present embodiment. The SDN system 1 illustrated in FIG. 1 includes a plurality of user terminals 2, a plurality of nodes 4 in an NW 3, and an SDN controller 5. The user terminal 2 is a terminal of a user of an NSP, which receives a communication service of the NSP in accordance with a service request. The user terminal 2 and the node 4 may be connected in a wired or wireless manner. The NSP is a VNO, an MVNO, and the like, which is contracted with a network operator of the NW 3, and provides a communication service to the user terminal 2 by using an assigned resource of the network operator. The SDN controller 5 is a resource management device that dynamically sets a resource of a communication service in accordance with a service request from the user terminal 2.

Figure 2:
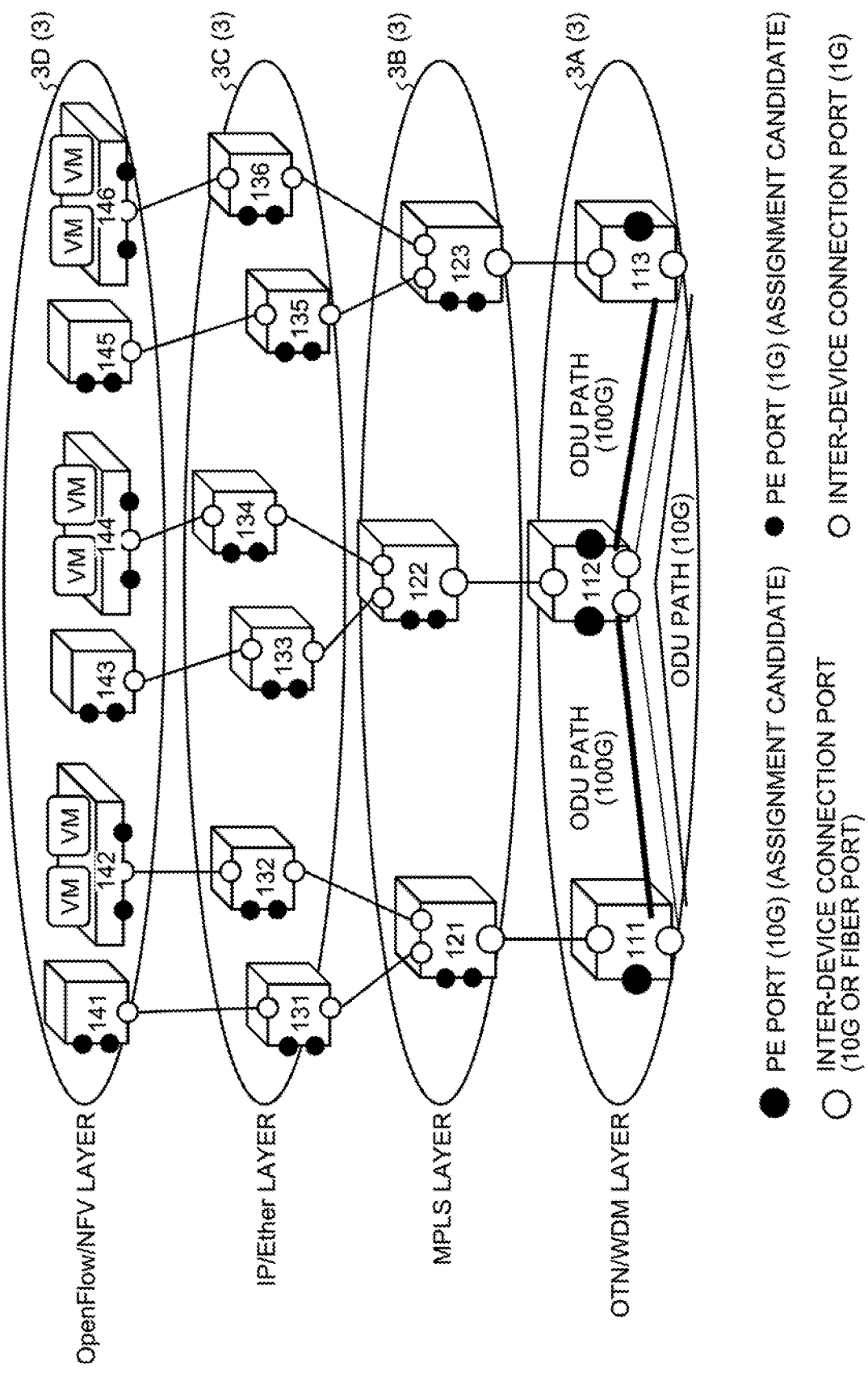
FIG. 2 is a diagram illustrating one example of a layer configuration of an NW.

FIG. 2 is a diagram illustrating one example of a layer configuration of the NW 3. The NW 3 illustrated in FIG. 2 includes a plurality of layers 3A to 3D. An Optical Transport Network/Wavelength Division Multiplexing layer (OTN/WDM layer) 3A includes, for example, OTN nodes 111, 112, and 113. The OTN node 111 includes ports whose transmission bands differ from each other in accordance with types of communication interfaces, and includes, for example, one assignment candidate port of 10 Gbps, one inter-device port of 10 Gbps, and one inter-device fiber port. The assignment candidate port is a PE port (illustrated by "●") that can be occupied by the user terminal 2. The inter-device port is a port (illustrated by "○") for connecting the nodes mutually. Transmission capacity of inter-device fiber ports differs depending on the multiple-wavelength on which Optical channel Data Unit (ODU) is loaded, and thus the interface speed thereof is variable. The OTN node 112 includes, for example, two assignment candidate ports of 10 Gbps, one inter-device port of 10 Gbps, and two inter-device fiber ports. The OTN node 113 includes, for example, one assignment candidate port of 10 Gbps, one inter-device port of 10 Gbps, and one inter-device fiber port.

A Multi-Protocol Label Switching layer (MPLS layer) 3B includes, for example, MPLS nodes 121, 122, and 123. Each of the MPLS nodes 121, 122, and 123 includes, for example, two assignment candidate ports of 1 Gbps, one inter-device port of 10 Gbps, and two inter-device ports of 1 Gbps.

An Internet Protocol/Ether layer (IP/Ether layer) 3C includes a plurality of routers 131, 133, and 135, and a plurality of switches 132, 134, and 136. Each of the routers 131, 133, and 135 includes, for example, two assignment candidate ports of 1 Gbps and two inter-device ports of 1 Gbps. Each of the switches 132, 134, and 136 includes, for example, two assignment candidate ports of 1 Gbps and two inter-device ports of 1 Gbps.

An OpenFlow/Network Function Virtualization layer (OpenFlow/NFV layer) 3D includes OpenFlow switches 141, 143, and 145, and general-purpose servers 142, 144, and 146. The general-purpose servers 142, 144, and 146 cause virtual machines (VMs) to function as Virtual Network Functions (VNFs) by using server resources such as a processor, a memory, and a storage. The VNF is a software appliance, for example, a software security gateway, a software accelerator, etc. Each of the general-purpose servers 142, 144, and 146 includes, for example, two VMs. Each of the general-purpose servers 142, 144, and 146 includes, for example, two assignment candidate ports of 1 Gbps and one inter-device port of 1 Gbps. Each of the OpenFlow Switches 141, 143, and 145 includes, for example, two assignment candidate ports of 1 Gbps and one inter-device port of 1 Gbps.

For example, an Ethernet (Registered Trademark) interface of 1000 Base-T whose transmission band is 1 Gbps is assumed to be used between the OpenFlow Switches 141, etc., the general-purpose servers 142, etc., the routers 131, etc., the switches 132, etc., and the MPLS nodes 121, etc.

For example, an Ethernet interface of 10 GBASE-SR, 10GBASE-LR, and the like, whose transmission band is 10 Gbps is used between the MPLS nodes 121, 122, and 123 and the OTN nodes 111, 112, and 113. For example, the OTN nodes 111 to 113 are connected with each other with respect to a plurality of optical signals whose light wavelengths are different from each other by using the same optical fibers. In a case where, the transmission capacity between the OTN nodes 111 to 113 depends on the number of multiplexed light wavelengths and a transmission band of a signal of an electronic line to be mapped on one wavelength. For example, between the OTN nodes 111 and 112, and between the OTN nodes 112 and 113, two ODU paths of ODU4 in a transmission band of 100 Gbps are set. Between the OTN nodes 111 and 113, an ODU path of ODU2 in a transmission band of 10 Gbps is set via the OTN node 112. The ODU path includes, other than ODU2 and ODU4, an ODU path such as ODU0 in a transmission band of 1.25 Gbps, ODU1 in a transmission band of 2.5 Gbps, or ODUflex in a transmission band that is variable by 1.25 Gbps. The paths of the broad band such as ODU2 and ODU4 may be preliminary set between the OTN nodes 111 to 113, and, on the basis of a service request from the user terminal 2, an ODU path such as ODU0, ODU1, or ODUflex that is adapted into the requested transmission band may be dynamically generated, and thus, the paths may be multiplexed. In a case where, for example, many service requests from the user terminals 2 are generated and a remaining transmission band of the broad band path runs short, when an unused wavelength between the OTN nodes 111 to 113 exists, a new broad band path may be dynamically generated to be added.

Figure 3:
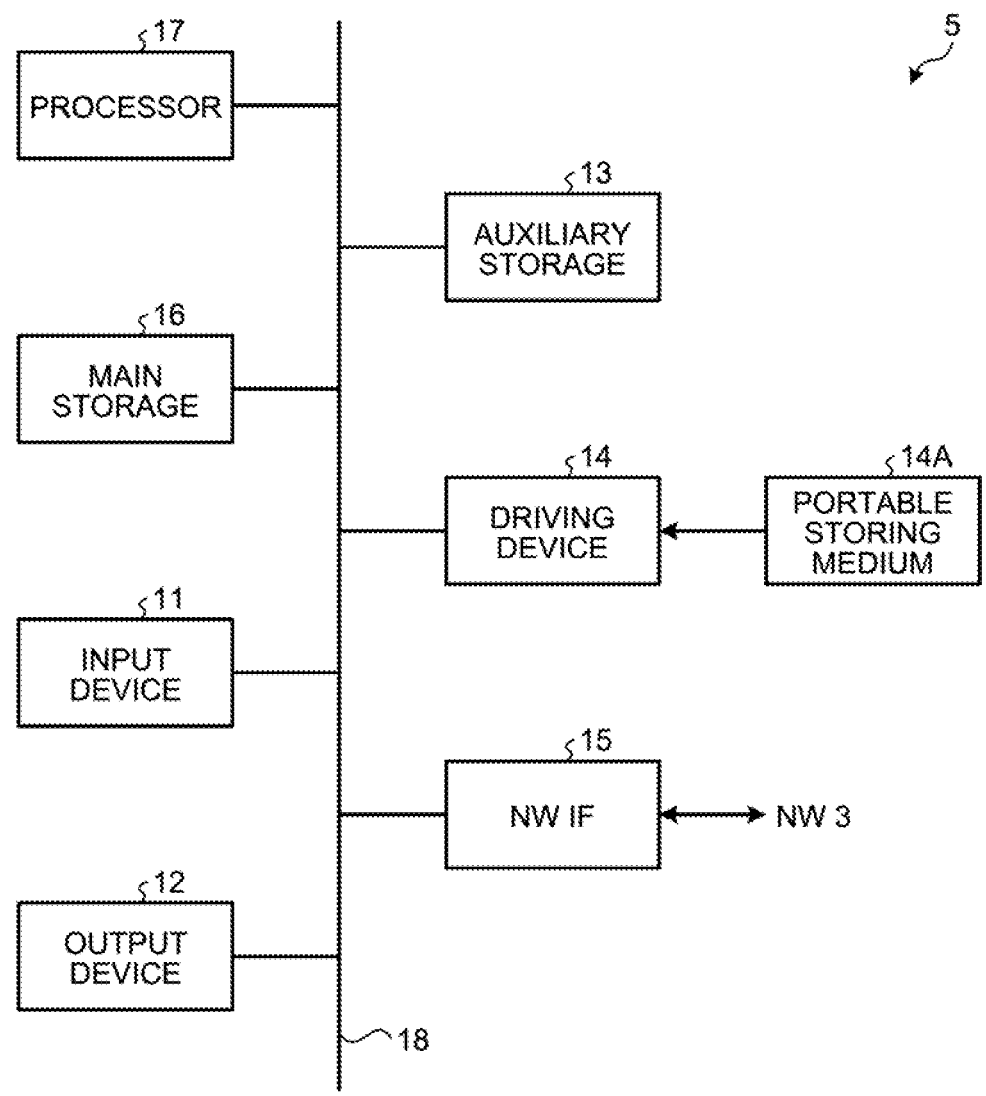
FIG. 3 is a block diagram illustrating a hardware configuration example of an SDN controller.

FIG. 3 is a block diagram illustrating a hardware configuration example of the SDN controller 5. The SDN controller 5 illustrated in FIG. 3 is a computer such as a server. The SDN controller 5 includes an input device 11, an output device 12, an auxiliary storage 13, a driving device 14, an NW interface (NW IF) 15, a main storage 16, a processor 17, and a bus 18.

The input device 11 is an input IF that includes pointing devices, etc., such as a keyboard and a mouse. The output device 12 outputs a result of a process of the processor 17, and is an output IF that includes, for example, a sound output device such as a speaker, a display, etc. The auxiliary storage 13 is a region where various programs and the data to be used by the processor 17 at the time of execution of each program are stored. The auxiliary storage 13 includes non-volatile memories such as an Erasable Programmable ROM (EPROM) and a Hard Disc Drive. The auxiliary storage 13 saves, for example, an Operating System (OS) and various application programs.

The driving device 14 reads a program and various data recorded in a portable storing medium 14A, and outputs the program and data to the processor 17. The portable storing medium 14A includes storing mediums such as a Secure Digital card (SD card), a mini-SD card, a micro-SD card, a Universal Serial Bus flash memory (USB flash memory), a Compact Disc (CD), a Digital Versatile Disc (DVD), and a flash memory card. The NW IF 15 is an interface that manages communication of information with, for example, the NW 3. The NW IF 15 includes an interface that is connected to the wired NW 3 or a wireless NW. The NW IF 15 includes, for example, a Network Interface Card (NIC), a wireless Local Area Network card (wireless LAN card), and the like.

The main storage 16 includes a semiconductor memory such as a Random Access Memory (RAM), which corresponds to a storage region or an operation region of the processor 17, in which a program stored in the auxiliary storage 13 is loaded. The processor 17 includes, for example, a Central Processing Unit (CPU) that controls whole of the SDN controller 5. The processor 17 loads an OS and various application programs, which are saved in the auxiliary storage 13 or the portable storing medium 14A, to the main storage 16 and executes the OS and programs to execute various processes. The number of the processors 17 is not limited to one, and may be two or more.

In a case where data is input by using the NW IF 15, the input device 11 is not always provided. Similarly, when data is input by using the NW IF 15, for example, the output device 12 is not always provided in the SDN controller 5.

Figure 4:
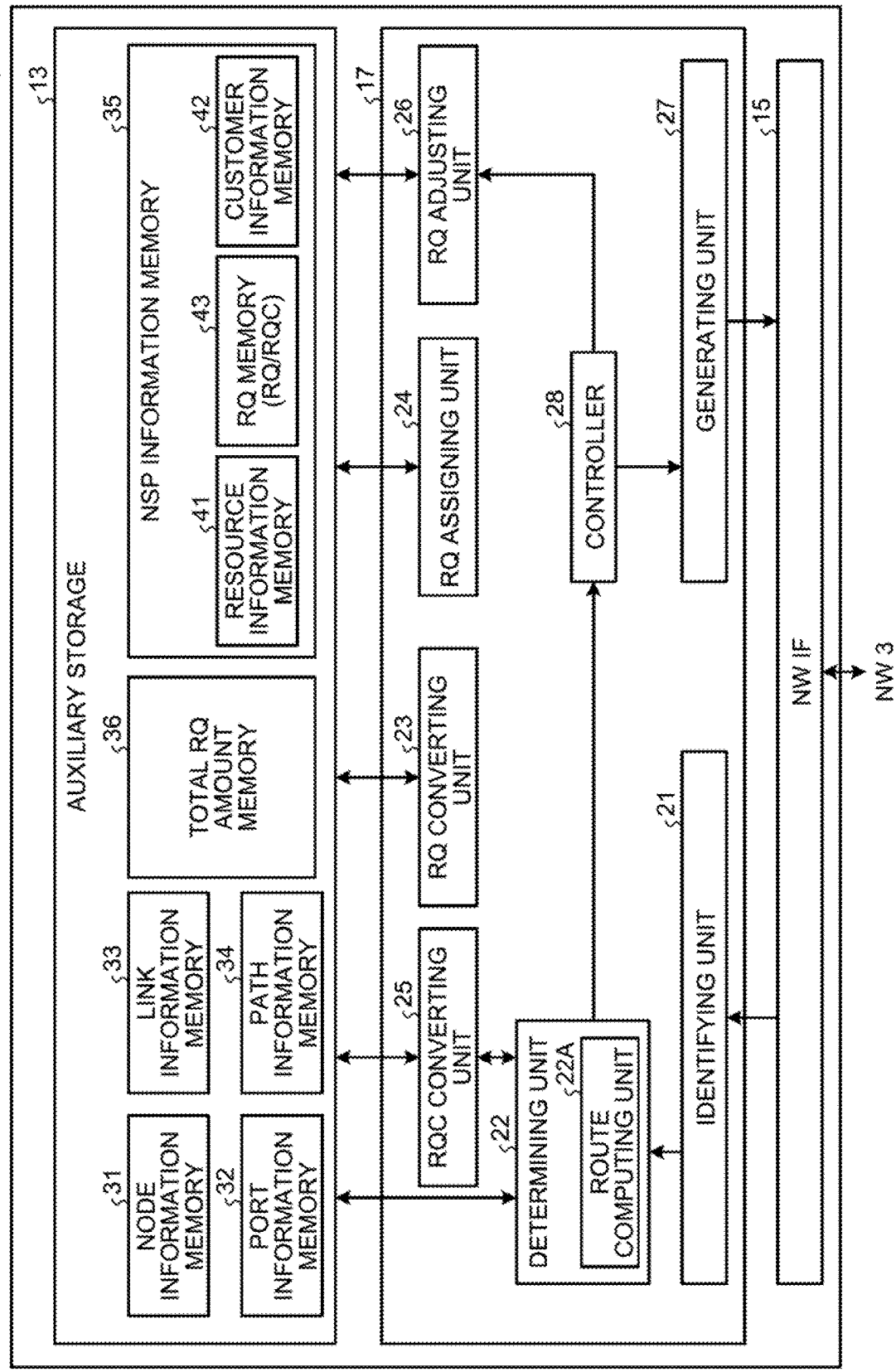
FIG. 4 is a block diagram illustrating one example of a functional configuration of the SDN controller.

FIG. 4 is a block diagram illustrating one example of a functional configuration of the SDN controller 5. The processor 17 in the SDN controller 5 illustrated in FIG. 4 includes, as process functions, an identifying unit 21, a determining unit 22, an RQ converting unit 23, an RQ assigning unit 24, an RQC converting unit 25, an RQ adjusting unit 26, a generating unit 27, and a controller 28.

Moreover, the auxiliary storage 13 includes a node information memory 31, a port information memory 32, a link information memory 33, a path information memory 34, an NSP information memory 35, and a total RQ amount memory 36. The node information memory 31 is a region in which node information of each node of layers 3A to 3D in the NW 3 is managed. In a case of the OTN/WDM layer 3A, the nodes are the OTN nodes 111 to 113, in a case of the MPLS layer 3B, the nodes are the MPLS nodes 121 to 123, and in a case of the IP/Ether layer 3C, the nodes are the routers 131, 133, and 135, and the switches 132, 134, and 136. In a case of the OpenFlow/NEV layer 3D, the nodes are, for example, the OpenFlow Switches 141, 143, and 145, and VMs on the general-purpose servers 142, 144, and 146. The node information is information for managing layer IDs that identify layers 3A to 3D to which the nodes belong, type IDs that identify types of the nodes, and node IDs that identify the nodes, in association with each other. For convenience of explanation, the auxiliary storage 13 is configured to include various memories 31 to 36. However, is not limited thereto, when a program of the SDN controller 5 operates, needed information may be read from the auxiliary storage 13 to the main storage 16, the computed result of various conversion values and the like may be stored in the main storage 16.

The port information memory 32 is a region in which port information on each port of the node is managed. The port information is information that manages, for example, node IDs that identify the nodes including ports, port IDs that identify the ports, type IDs that identify inter-device ports or assignment candidate ports, and transmission bands of the ports in association with each other. The link information memory 33 is a region in which link information on a link between the nodes is managed. The link information is information that manages, for example, link IDs that identify links, start point IDs that identify start point nodes of links, and end point IDs that identify end point nodes of links in association with each other.

The path information memory 34 is a region in which, for example, path information on the path that connects the nodes using one or more links is managed. The path information is information that manages, for example, path IDs that identify the paths, start point IDs that identify start point nodes of the paths, and end point IDs that identify end point nodes of the paths in association with each other. Static information saved in the auxiliary storage 13 may be read or the input device 11 may be used to set the node information, the port information, the link information, and the path information.

The NSP information memory 35 is a region in which NSP information on the NSPs is stored. The NSP information memory 35 includes a resource information memory 41, a customer information memory 42, and an RQ memory 43. The resource information memory 41 is a region in which the resource amount assigned to each NSP in the NW 3 is stored. The customer information memory 42 is a region in which customer information of a user of each NSP is stored. The customer information is information that manages, for example, user IDs that identify users being NSP contractants and service contents of the users in association with each other.

The total RQ amount memory 36 is a region in which a Resource Quotas (RQ) that corresponds to the resource amount of each of the layers 3A to 3D in the NW 3 is stored. The resource amount is, in the total resource amount in the NW 3, the exclusively assignable quantity of assignment candidates for each NSP caused by the setting of communication connection based on a service request. A target of the quantity of assignment candidates includes the resource amount of, for example, an assignment candidate port, a transmission band of an ODU path, etc. The RQ is a conversion value that is the converted resource amount by using a predetermined reference rate. The SDN controller 5 does not assign a resource being usable in each NSP by using a specific resource in the NW 3, and not depending on the specific resource, assigns the resource amount in the NW 3 by using the RQ that is an index being a converted result by using the reference rate. The total RQ amount memory 36 totalizes RQs of the layers 3A to 3D, and stores the total RQ amount that indicates the total resource amount of whole of the NW 3. FIG. 5 is a diagram illustrating one example of the total RQ amount memory 36. The total RQ amount memory 36 manages, for example, layer IDs that identify layers, resource IDs that identify resources, total number of the resources, the quantity of assignment candidates, and the RQs in association with each other.

The RQ memory 43 is a region in which an assigned RQ that is assigned for each NSP and an RQC (requested RQ) to be consumed by a communication service of a service request are stored in association with each other. The assigned RQ is an RQ that is a converted result of the assigned resource amount assigned to an NSP by using the reference rate. The RQC is a requested RQ that is a converted result of the requested resource amount of a service request by using the reference rate.

The identifying unit 21 identifies a packet received from the NW 3 via the NW IF 15. The determining unit 22 determines whether or not a service request is acceptable in response to a service request from the user terminal 2. The determining unit 22 includes a route computing unit 22A. The route computing unit 22A computes a use path of the communication service in response to the service request at the minimum cost.

The RQ converting unit 23 computes an RQ by using the reference rate for each quantity of assignment candidates. In the reference rate, for example, "1 Gbps" corresponds to "RQ=1", and "one VM" corresponds to "RQ=1". The RQ converting unit 23 acquires, for example, 12 of quantity of assignment candidates of the 1-Gbps ports in the OpenFlow/NEV layer 3D on the basis of the node information and port information in the OpenFlow/NEV layer 3D illustrated in FIG. 2. In a case where the quantity of assignment candidates of 1-Gbps ports is "12", the RQ converting unit 23 converts the RQ into "12" on the basis of the reference rate. The RQ converting unit 23 stores RQ "12" in association with the port (1 G), "18" of the total quantity thereof, and "12" of the quantity of assignment candidates of the OpenFlow/NEV layer 3D in the total RQ amount memory 36 illustrated in FIG. 5.

The RQ converting unit 23 acquires "6" of the quantity of assignment candidates of the VMs in the OpenFlow/NEV layer 3D on the basis of the node information and the port information in the OpenFlow/NEV layer 3D illustrated in FIG. 2. In a case where the quantity of assignment candidates of the VMs is "6", the RQ converting unit 23 converts the RQ into "6" on the basis of the reference rate. The RQ converting unit 23 stores RQ "6" in association with the VM, "6" of the total quantity thereof, and "6" of the quantity of assignment candidates of the OpenFlow/NEV layer 3D in the total RQ amount memory 36 illustrated in FIG. 5.

The RQ converting unit 23 acquires "12" of the quantity of assignment candidates of 1-Gbps ports in the OpenFlow/NEV layer 3D on the basis of the node information and the port information in the IP/Ether layer 3C illustrated in FIG. 2. In a case where the quantity of assignment candidates of 1-Gbps ports is "12", the RQ converting unit 23 converts the RQ into "12" on the basis of the reference rate. The RQ converting unit 23 stores RQ "12" in association with the port (1 G), "24" of the total quantity thereof, and "12" of the quantity of assignment candidates of the IP/Ether layer 3C in the total RQ amount memory 36 illustrated in FIG. 5.

The RQ converting unit 23 acquires "6" of the quantity of assignment candidates of 1-Gbps ports in the MPLS layer 3B on the basis of the node information and the port information in the MPLS layer 3B illustrated in FIG. 2. In a case where the quantity of assignment candidates of 1-Gbps ports is "6", the RQ converting unit 23 converts the RQ into "6" on the basis of the reference rate. The RQ converting unit 23 stores RQ "6" in association with the port (1 G), "12" of the total quantity thereof, and "6" of the quantity of assignment candidates of the MPLS layer 3B in the total RQ amount memory 36 illustrated in FIG. 5.

The RQ converting unit 23 acquires "0" of the quantity of assignment candidates of 10-Gbps ports in the MPLS layer 3B on the basis of the node information and the port information in the MPLS layer 3B illustrated in FIG. 2. In a case where the quantity of assignment candidates of 10-Gbps ports is "0", the RQ converting unit 23 converts the RQ into "0" on the basis of the reference rate. The RQ converting unit 23 stores RQ "0" in association with the port (10 G), "3" of the total quantity thereof, and "0" of the quantity of assignment candidates of the MPLS layer 3B in the total RQ amount memory 36 illustrated in FIG. 5.

The RQ converting unit 23 acquires "4" of the quantity of assignment candidates of 10-Gbps ports in the OTN/WDM layer 3A on the basis of the node information and the port information in the OTN/WDM layer 3A illustrated in FIG. 2. In a case where the quantity of assignment candidates of 10-Gbps ports is "4", the RQ converting unit 23 converts the RQ into "40" on the basis of the reference rate. The RQ converting unit 23 stores RQ "40" in association with the port (10 G), "11" of the total quantity thereof, and "4" of the quantity of assignment candidates of the OTN/WDM layer 3A in the total RQ amount memory 36 illustrated in FIG. 5.

The RQ converting unit 23 acquires "2" of the quantity of assignment candidates of ODU paths of 100 Gbps in the OTN/WDM layer 3A on the basis of the node information and the link information in the OTN/WDM layer 3A illustrated in FIG. 2. In a case where the quantity of assignment candidates of ODU paths of 100 Gbps is "2", the RQ converting unit 23 converts the RQ into "200" on the basis of the reference rate. The RQ converting unit 23 stores RQ "200" in association with the ODU path (100 G), "2" of the total quantity thereof, and "2" of the quantity of assignment candidates of the OTN/WDM layer 3A in the total RQ amount memory 36 illustrated in FIG. 5.

The RQ converting unit 23 acquires "1" of the quantity of assignment candidates of ODU paths of 10 Gbps in the OTN/WDM layer 3A on the basis of the node information and the link information in the OTN/WDM layer 3A illustrated in FIG. 2. In a case where the quantity of assignment candidates of ODU paths of 10 Gbps is "1", the RQ converting unit 23 converts the RQ into "10" on the basis of the reference rate. The RQ converting unit 23 stores RQ "10" in association with the ODU path (10 G), "1" of the total quantity thereof, and "1" of the quantity of assignment candidates of the OTN/WDM layer 3A in the total RQ amount memory 36 illustrated in FIG. 5. Moreover, the RQ converting unit 23 sums up all of the RQs in layers 3A to 3D to compute the total RQ amount "286", and stores the total RQ amount "286" in the total RQ amount memory 36.

The RQ assigning unit 24 computes an assigned RQ of each NSP in accordance with a quotient distribution of the corresponding NSP from the total RQ amount. The quotient distribution is an assigned distribution of resources in an NW of each NSP, which is decided on the basis of, for example, use contents, an enterprise contract charge, etc. decided in the enterprise contract between an NSP as being a VNO and a network operator. For example, the RQ assigning unit 24 sets the total RQ amount to "286", when the number of the NSPs is three, the assigned RQ of an NSP-A to "96", the assigned RQ of an NSP-B to "95", and the assigned RQ of an NSP-C to "95".

The determining unit 22 identifies a contracted NSP of a user in a service request in response to the service request. The determining unit 22 identifies the QoS (Quality of Service) including a type of the communication service of the service request, a requested interval for connecting, a used band, communication delay, etc. The route computing unit 22A of the determining unit 22 computes the optimum path to be used in the communication service at, for example, the minimum cost on the basis of the type, the interval, and the QoS of the communication service. The RQC converting unit 25 converts the requested resource amount on the optimum path, in other words, the resource amount to be consumed by the communication service of the service request, into the RQC of RQ units on the basis of the reference rate.

The determining unit 22 determines whether or not the RQC of the service request is in the assigned RQ of the NSP of the service request. In a case where the RQC is in the assigned RQ, the determining unit 22 determines that the communication service of the service request is acceptable. In a case where the RQC is not in the assigned RQ, the determining unit 22 determines that the communication service of the service request is not acceptable.

In a case where the communication service of the service request is determined to be acceptable, the controller 28 sends a setting instruction to the generating unit 27 to set a control message for each node on the optimum path of the service request. In a case where the communication service of the service request is determined to be unacceptable, the controller 28 sends, to the RQ adjusting unit 26, an adjustment instruction to adjust the assigned RQs between NSPs.

The generating unit 27 generates a control message in accordance with a control protocol of each node on the basis of the setting instruction from the controller 28, and sends the control message to each node on the optimum path by using the NW IF 15. As the control protocol, control protocols such as an OpenFlow, a Transaction Language (TL1), and a NETCONF may be used in accordance with a type of the node. The RQ adjusting unit 26 adjusts the amount of the assigned RQs between NSPs in accordance with the adjustment instruction.

Figure 6:
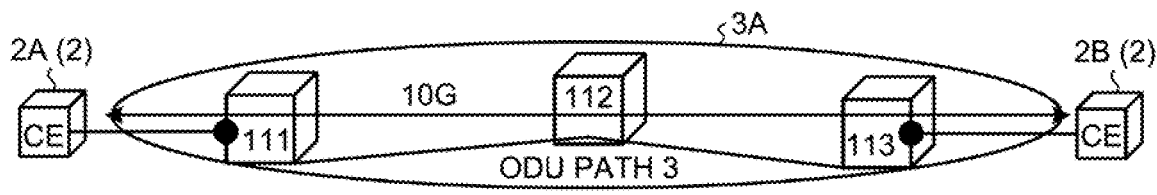
FIG. 6 is a diagram illustrating one example of an RQC conversion of a service request in an OTN/WDM layer.

Next, operations of the SDN system 1 according to the present embodiment will be explained. First, operations of the RQC converting unit 25 will be explained. The RQC converting unit 25 converts a requested resource amount of the communication service of the service request into the RQC of RQ units on the basis of the reference rate. The RQC is a requested RQ that is the converted requested resource amount to be used in a service setting into RQ units in response to a service request from the user terminal 2. FIG. 6 is a diagram illustrating one example of an RQC conversion of a service request in the OTN/WDM layer 3A.

The service request is a communication request by the NSP-A for communication between a user terminal 2A and a user terminal 2B in a transmission band of 10 Gbps by using the OTN/WDM layer 3A. In this case, the route computing unit 22A computes the optimum path of the communication service corresponding to the service request. Contents of the optimum path is that, for example, the user terminal 2A is connected to a 10-Gbps port of the OTN node 111, and the user terminal 2B is connected to a 10-Gbps port of the OTN node 113. Moreover, as the contents of the optimum path, a transmission band of 10 Gbps is needed among the ODU paths of 10 Gbps between the OTN nodes 111 and 113. As a result, the requested resource amount of the service request includes one 10-Gbps port of the OTN node 111, one 10-Gbps port of the OTN node 113, and a transmission band of 10-Gbps. The RQC converting unit 25 computes "RQC=30" on the basis of "10*2+10", because "RQ=10" in a 10-Gbps port and "RQ=10" in a transmission band of 10-Gbps.

For example, when the assigned RQ of the NSP-A of the service request is "50", because RQC "30" is equal to or less than the assigned RQ "50" of the NSP-A, the determining unit 22 sets the communication service of the service request to be acceptable. The controller 28 reserves, by the time the communication service of the service request is terminated, a requested resource of the service request so that the resource is not used by another user terminal 2. Moreover, the controller 28 sends a setting instruction to the generating unit 27 to set path information for the requested resource of the service request.

Figure 7:
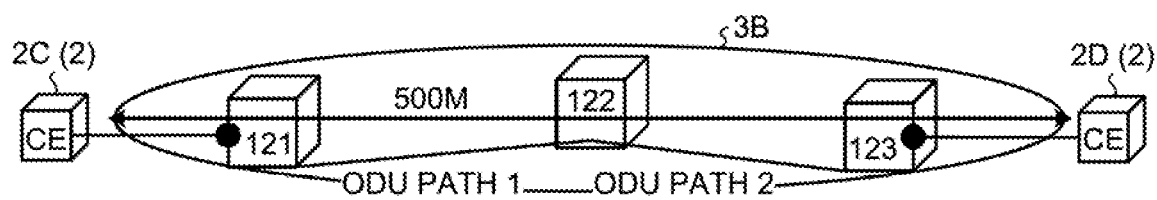
FIG. 7 is a diagram illustrating one example of an RQC conversion of a service request in an MPLS layer.

FIG. 7 is a diagram illustrating one example of an RQC conversion of a service request in the MPLS layer 3B. The service request is a communication request by the NSP-B for communication between a user terminal 2C and a user terminal 2D in a transmission band of 500 Mbps by using the MPLS layer 3B. In this case, the route computing unit 22A computes the optimum path of a communication service corresponding to the service request. Contents of the optimum path is that, for example, the user terminal 2C is connected to a 1-Gbps port of the MPLS node 121, and the user terminal 2D is connected to a 1-Gbps port of the MPLS node 123. As the contents of the optimum path, 500 Mbps (=0.5 Gbps) in 100 Gbps of an ODU path between the MPLS nodes 121 and 122, and 500 Mbps in 100 Gbps of an ODU path between the MPLS nodes 122 and 123 are needed. As a result, the requested resource amount of the service request includes one 1-Gbps port of the MPLS node 121, one 1-Gbps port of the MPLS node 123, and a transmission band of 500 Mbps. The RQC converting unit 25 computes "RQC=2.5" on the basis of "1*2 (ports)+0.5".

For example, when an assigned RQ of the NSP-B of the service request is "20", because RQC "2.5" is equal to or less than the assigned RQ "20", the determining unit 22 sets the communication service of the service request to be acceptable. The controller 28 reserves, by the time the communication service of the service request is terminated, a requested resource of the service request so that the resource is not used by another user terminal 2. Moreover, the controller 28 sends a setting instruction to the generating unit 27 to set path information on the service request for the requested resource of the service request. The controller 28 executes label setting for executing tunnel transfer of packets between the MPLS nodes 121 and 123 via a Label Switch Path (LSP), and switching setting for allocating the LSP to an ODU path.

In a conversion example of the RQC illustrated in FIG. 7, a transmission band of 500 Mbps is assumed to be ensured by using a band control such as the traffic shaping in the MPLS nodes 121 to 123. In a conversion example illustrated in FIG. 7, two paths, in all, of an ODU path between the MPLS nodes 121 to 123 and an ODU path between the MPLS nodes 121 to 123 are needed, however, one 500 Mbps path between the user terminals 2C and 2D is assumed to exist in end to end. As a result, RQC of the used band is "0.5". For example, the connecting method of the route between the user terminals 2C and 2D is not specifying as a service request, but selecting by using a situation of the band resource in the NW 3 and route computing of the NSP-B. Therefore, even when the route becomes a roundabout route of two or more hops caused by the result of the route computing, only the amount of the request band of the user being as the RQC to be consumed is set to be a computing target.

Figure 8:
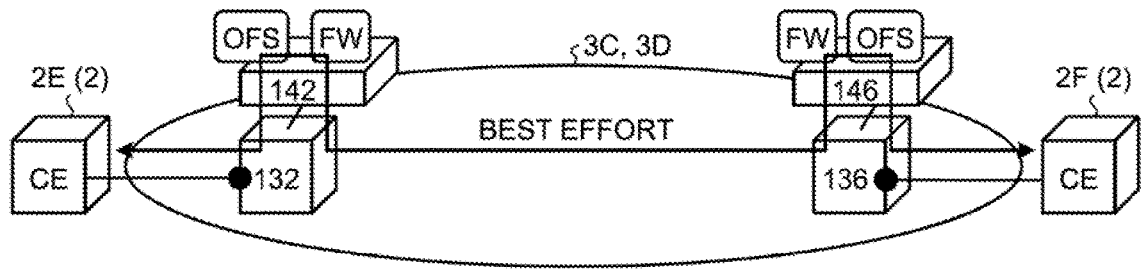
FIG. 8 is a diagram illustrating one example of RQC conversions of service requests in IP/Ether and OpenFlow/NEV layers.

FIG. 8 is a diagram illustrating one example of RQC conversions of service requests in the IP/Ether layer 3C and an OpenFlow/NEV layer 3D. The service request is a communication request of the NSP-C for communication between a user terminal 2E and a user terminal 2F with best-effort by using the IP/Ether layer 3C and the OpenFlow/NEV layer 3D. In this case, the route computing unit 22A computes the optimum path of a communication service corresponding to the service request. Contents of the optimum path is that, for example, the user terminal 2E is connected to a 1-Gbps port of the switch 132 and the user terminal 2F is connected to a 1-Gbps port of the switch 136. Moreover, the route with best-effort is assumed to be "switch 132→server 142 (OFS→FW)→switch 132→switch 136→server 146 (FW→OFS)→switch 136" as contents of the optimum path. The FW corresponds to a virtual firewall device and the OFS corresponds to a virtual OpenFlow Switching device. As a result, the requested resource amount of the service request includes one 1-Gbps port of the switch 132, one 1-Gbps port of the switch 136, and four VMs of the FWs and OFSs. The RQC converting unit 25 computes "RQC=6" on the basis of "1*2 (ports)+1*4 (machines)". The Best-Effort (BE) is assumed to be "RQ=O".

For example, when an assigned RQ of the NSP-C of the service request is "30", because RQC "6" is equal to or less than the assigned RQ "30", the determining unit 22 sets the communication service of the service request to be acceptable. The controller 28 reserves, by the time the communication service of the service request is terminated, a requested resource of the service request so that the resource is not used by another user terminal 2. Moreover, the controller 28 sends a setting instruction to the generating unit 27 to set path information of the service request for the requested resource of the service request.

In a case where the RQC of the service request is not equal to or less than the assigned RQ of the NSP of the service request, the RQ adjusting unit 26 refers to an assigned RQ of another NSP, and borrows the shortage amount of RQC of the service request from the assigned RQ of the another NSP. The RQ adjusting unit 26 adds the shortage amount of RQC to the assigned RQ of the NSP of the service request from the another NSP, subtracts the lending RQ from the assigned RQ of the lender NSP, and updates contents of the total RQ amount memory 36. Moreover, after termination of the communication service corresponding to the service request, the RQ adjusting unit 26 returns the lending RQ to the assigned RQ of the lender NSP, and thus updates contents of the total RQ amount memory 36.

Figure 9:
FIG. 9 is a diagram illustrating one example of a correspondence table of an assigned RQ and a total RQC for each NSP before and after adjustment.

FIG. 9 is a diagram illustrating one example of a correspondence table of an assigned RQ and a total RQC for each NSP before and after adjustment. It is assumed that the assigned RQ of the NSP-A before adjustment is "50", the total RQC thereof is "35", the assigned RQ of the NSP-B thereof is "30", the total RQC thereof is "30", the assigned RQ of the NSP-C thereof is "20", and the total RQC thereof is "10". The total RQC is the RQC corresponding to the resource amount in being consumed, which is consumed by the currently-set communication service. In a case where a new service request of RQC "5" is detected in the NSP-B, because the assigned RQ and the total RQC of the NSP-B are the same and assignable remaining RQ is zero, the RQ adjusting unit 26 lends "5" to the assigned RQ of the NSP-B from the assigned RQ of the NSP-A. As a result, the assigned RQ of the NSP-A after the adjustment is "45" (lent "5"), the total RQC thereof is "35", the assigned RQ of the NSP-B thereof is "35" (borrowed "5"), the total RQC thereof is "30", the assigned RQ of the NSP-C thereof is "20", and the total RQC thereof is "10". In a case where the assigned RQ of another NSP is small, the RQ adjusting unit 26 rejects the lending adjustment of the assigned RQ.

Figure 10:
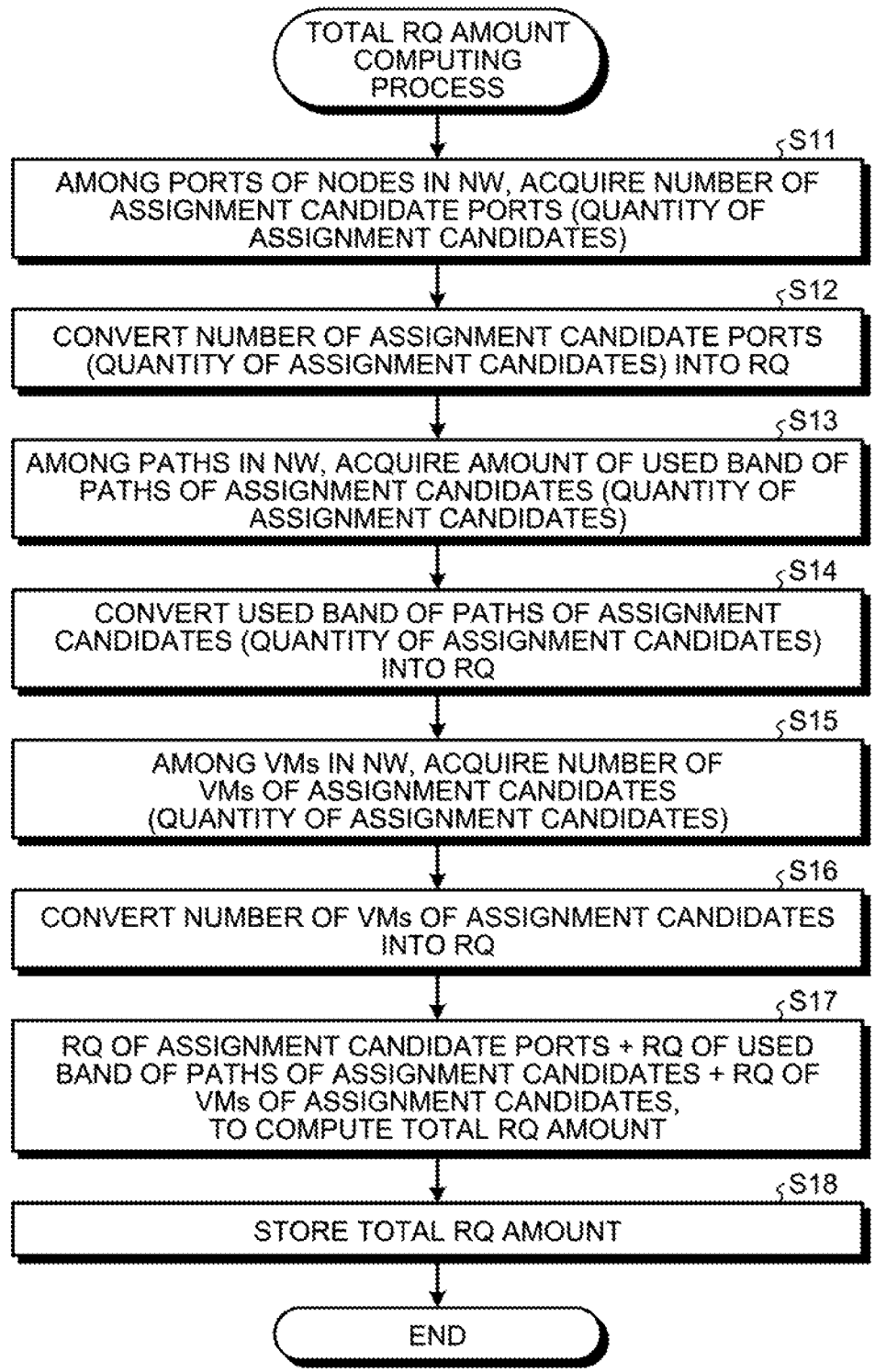
FIG. 10 is a flowchart illustrating one example of processing operations of a processor in the SDN controller, which is associated with a total RQ amount computing process.

FIG. 10 is a flowchart illustrating one example of processing operations of a processor 17 in the SDN controller 5, which is associated with a total RQ amount computing process. The total RQ amount computing process illustrated in FIG. 10 is a process that converts the resource amount in the NW 3, in other words, the quantity of assignment candidates into RQ units to compute the total RQ amount.

The RQ converting unit 23 of the processor 17 in the SDN controller 5 refers to the port information memory 32, and acquires the resource amount of each type of the port among assignment candidate ports of the nodes in layers 3A to 3D of the NW 3, in other words, the number of ports of each type of the port (quantity of assignment candidates) (Step S11). The RQ converting unit 23 converts the acquired number of ports of each type of the port into RQ on the basis of the reference rate (Step S12). The reference rate is assumed that, for example, one 1-Gbps port is "RQ=1".

The RQ converting unit 23 refers to the link information memory 33, and acquires the resource amount of path of the assignment candidate in the NW 3, in other words, the amount of the used band (quantity of assignment candidates) (Step S13). The RQ converting unit 23 converts the acquired amount of the used bands of the assignment candidates of paths into RQ on the basis of the reference rate (Step S14). The reference rate is assumed that, for example, 1 Gbps of the amount of the used band is "RQ=1".

The RQ converting unit 23 refers to the node information memory 31, and acquires the resource amount of VMs of the assignment candidates in the NW 3, in other words, the number of the VMs (quantity of assignment candidates) (Step S15). The RQ converting unit 23 converts the acquired number of VMs of the assignment candidates into RQ on the basis of the reference rate (Step S16). The reference rate is assumed that, for example, one VM is "RQ=1". The RQ converting unit 23 sums up the RQ of the number of ports of each type of the assignment candidate port, the RQ of the amount of the used band of the assignment candidate, and the RQ of the number of the VMs of assignment candidates to compute the total RQ amount (Step S17). The RQ converting unit 23 stores the computed total RQ amount in the total RQ amount memory 36 (Step S18), and terminates the processing operation illustrated in FIG. 10.

The processor 17 that executes the total RQ amount computing process illustrated in FIG. 10 converts, among all of the resource amounts in the NW 3, the resource amounts of assignment candidates to be occupied for each NSP into RQs, sums up the RQs of NSPs, computes the total RQ amount, and stores the computed total RQ amount in the total RQ amount memory 36. As a result, the processor 17 can compute the total RQ amount of the total resource amount of an assignment candidate in the NW 3.

Figure 11:
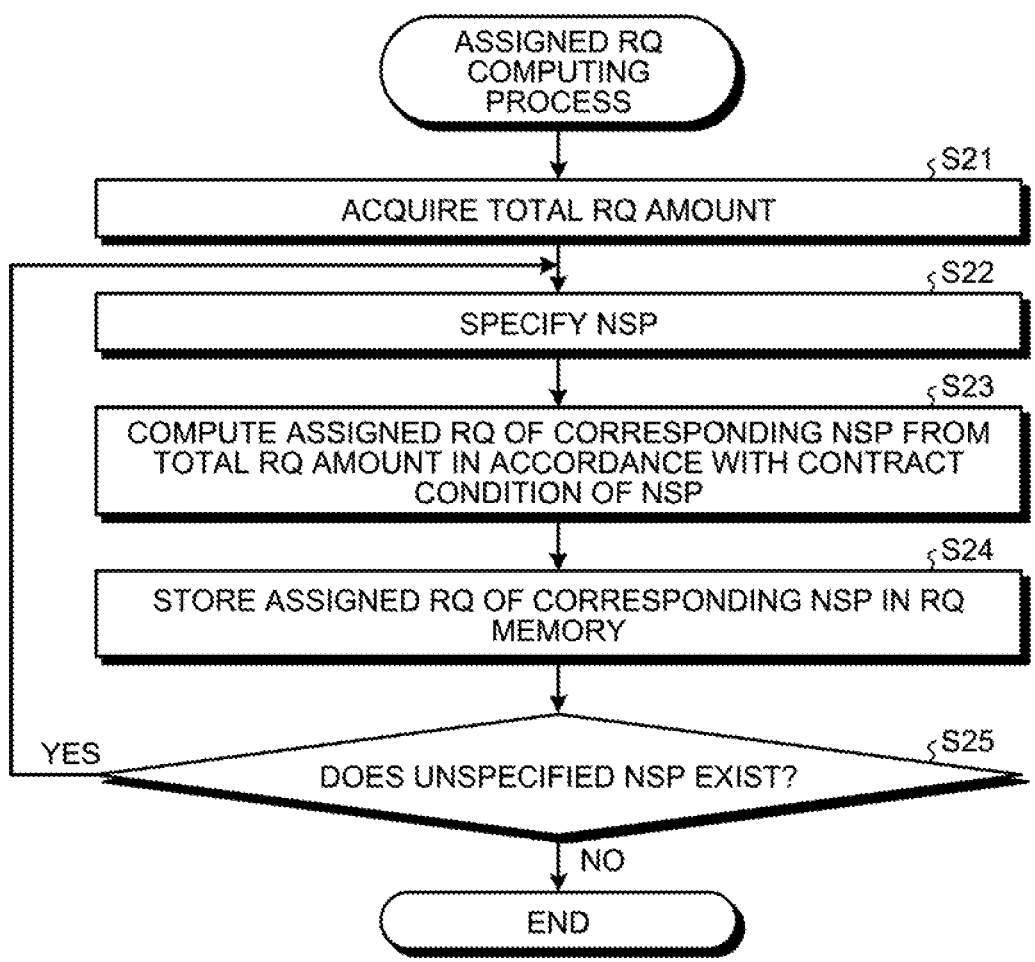
FIG. 11 is a flowchart illustrating one example of processing operations of the processor in the SDN controller, which is associated with an assigned RQ computing process.

FIG. 11 is a flowchart illustrating one example of processing operations of the processor 17 in the SDN controller 5, which is associated with an assigned RQ computing process. An assigned RQ computing process illustrated in FIG. 11 is a process that computes an assigned RQ of each NSP in accordance with a quotient distribution of the corresponding NSP.

The RQ assigning unit 24 in the processor 17 of the SDN controller 5 acquires the total RQ amount from the total RQ amount memory (Step S21). The RQ assigning unit 24 specifies an NSP (Step S22), refers to the resource information memory 41, computes an assigned RQ of the NSP from the total RQ amount on the basis of a contract condition of the NSP (Step S23). The number of the resources to be used in the contract condition of the NSP is assumed to be decided at the time of making the contract for each NSP. The RQ assigning unit 24 stores the computed assigned RQ of the NSP in the RQ memory 43 (Step S24), and determines whether or not an unspecified NSP exists (Step S25).

In a case where an unspecified NSP exists (Step S25: Yes), the RQ assigning unit 24 shifts to Step S22 to specify the unspecified NSP. In a case where an unspecified NSP does not exist (Step S25: No), the RQ assigning unit 24 terminates the processing operation illustrated in FIG. 11.

The processor 17 that executes the assigned RQ computing process illustrated in FIG. 11 computes an assigned RQ that corresponds to the contracted resource amount of each NSP from the total RQ amount, and stores the computed assigned RQ in the RQ memory 43. As a result, the processor 17 can compute the assigned RQ of each NSP.

Figure 12:
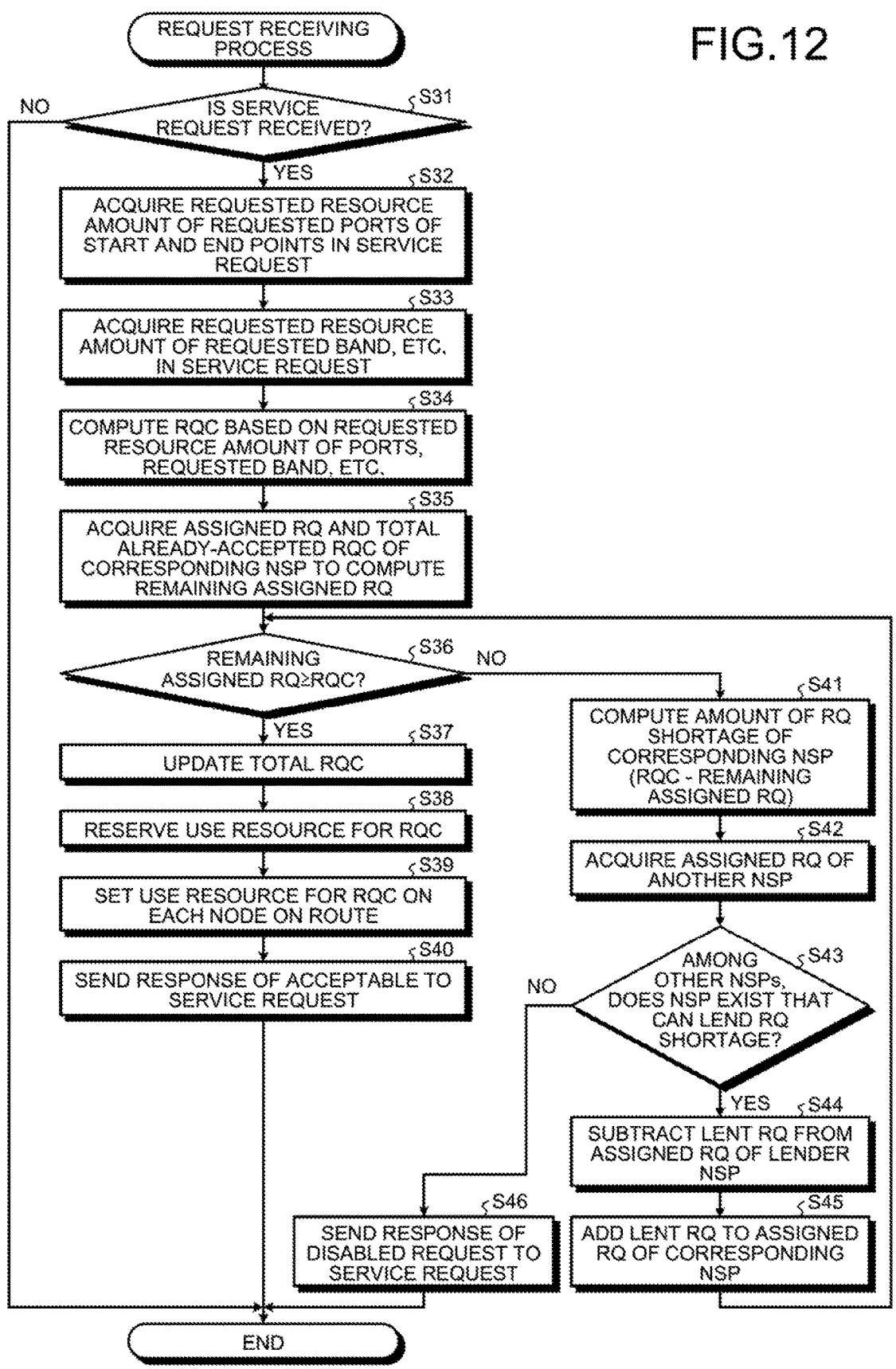
FIG. 12 is a flowchart illustrating one example of processing operations of the processor in the SDN controller, which is associated with a request receiving process.

FIG. 12 is a flowchart illustrating one example of processing operations of the processor 17 in the SDN controller 5, which is associated with a request receiving process. The request receiving process illustrated in FIG. 12 is a process that compares the RQC of the service request with the assigned RQ, and determines whether or not the communication service of the service request is acceptable.

The determining unit 22 in the processor 17 of the SDN controller 5 determines whether or not a service request from the user terminal 2 is received (Step S31). Moreover, the determining unit 22 specifies an address of an access destination of the service request from the user terminal 2 and an NSP of the service request from a Uniform Resource Locator (URL), refers to the customer information of the specified NSP, and specifies the user. When receiving the service request (Step S31: Yes), the determining unit 22 acquires a port of the start point and a port of the end point in the service request (Step S32). The determining unit 22 refers to the port information memory 32, and acquires ports and types of the ports of the start and end points of the service request. The ports of the start and end points of the service request may be directly specified from the user terminal 2, or may be specified by ports to be connected by the user terminal 2, which are specified from addresses of nodes of the start and end points, etc. The determining unit 22 acquires the request band, the QoS, etc. between the start and end points in the service request (Step S33). The QoS includes the service quality such as the best-effort.

The RQC converting unit 25 in the processor 17 converts the requested number of ports and the request band amount of the service request in to RQ units on the basis of the reference rate to compute the RQC (Step S34). The determining unit 22 acquires an assigned RQ corresponding to the NSP of the service request and the total RQC of already-accepted service requests, and subtracts the total RQC of the already-received services from the assigned RQ to compute the remaining assigned RQ (Step S35). Moreover, the determining unit 22 determines whether or not the RQC is equal to or less than the remaining assigned RQ (equal to or less than remaining assigned RQ that is result of subtraction of total RQC of already-received service requests from assigned RQ) (Step S36).

In a case where the RQC is equal to or less than the remaining assigned RQ (Step S36: Yes), the controller 28 adds the RQC of the service request here to the total RQC of the corresponding NSP to update the total RQC in the RQ memory 43 (Step S37), and reserves a use resource for the RQC (Step S38). The controller 28 sends a setting instruction to the generating unit 27 to set the use resource for the RQC on each node on the route (Step S39). The generating unit 27 sends a response of acceptable to the communication service of the service request (Step S40), and terminates the processing operation illustrated in FIG. 12.

In a case where the RQC is not equal to or less than the remaining assigned RQ (Step S36: No), the RQ adjusting unit 26 computes the amount of RQ shortage of the corresponding NSP, in other words, "RQC-remaining assigned RQ" (Step S41), refers to the RQ memory 43, and acquires the assigned RQ of another NSP (Step S42). In the example illustrated in FIG. 9, the NSP-B borrows "5" from the quotient "50" of the NSP-A.

The RQ adjusting unit 26 determines whether or not the NSP exists, among the other NSPs, which includes the remaining assigned RQ that causes the amount of RQ shortage to be lendable (Step S43). In a case where the NSP includes the remaining assigned RQ that causes the amount of RQ shortage to be lendable (Step S43: Yes), the RQ adjusting unit 26 subtracts a lent RQ from the assigned RQ of a lender NSP (Step S44). Moreover, the RQ adjusting unit 26 adds the lent RQ to the assigned RQ of the NSP (Step S45), and shifts to Step S36 to determine whether or not the RQC is equal to or less than the remaining assigned RQ. In the example illustrated in FIG. 9, when the remaining assigned RQ (=0) of the NSP-B runs short, when the remaining assigned RQ (50−35=15) of the NSP-A≥the RQC (=5) of the service request, the shortage amount (=RQC−remaining assigned RQ=5−0=5) is lent to the NSP-B from the assigned RQ of the NSP-A (=50).

In a case where the NSP that includes the remaining assigned RQ that causes the amount of RQ shortage to be lendable does not exist (Step S43: No), the controller 28 sends a response of disabled request to the service request (Step S46), and terminates the processing operation illustrated in FIG. 12. In a case where the service request is not received (Step S31: No), the determining unit 22 terminates the processing operation illustrated in FIG. 12.

The processor 17 that executes the request receiving process converts the resource amount of the service request into the RQC when the RQC is equal to or less than the remaining assigned RQ of the NSP of the service request, and causes the communication service of the service request to be acceptable. As a result, the processor 17 can accept the communication service of the service request.

In a case where the RQC is not equal to or less than the remaining assigned RQ of the NSP of the service request, the processor 17 borrows the shortage amount of RQ from the assigned RQ of another NSP, when the RQC is equal to or less than the remaining assigned RQ, causes the communication service of the service request to be acceptable. As a result, the processor 17 can accept the communication service of the service request.

When the RQC is not equal to or less than the remaining assigned RQ even when the assigned RQ is adjusted by using the assigned RQ of another NSP, the processor 17 causes the receipt of the service request to be disabled. As a result, the processor 17 can reject the receipt of the service request.

In the present embodiment, the specific resource of the NW 3 fixedly assigned to each NSP is not used, but a requested resource is dynamically assigned within the range of the assigned RQ of each NSP on the basis of a service request from the user terminal 2. As a result a resource is shared between the NSPs, and the use efficiency of the resource is improved. Moreover, a situation in which a specific resource is excessively consumed in a specified NSP is avoided, and thus the equitability can be kept. The equitability is not in a way of thinking that recognizes the equality when the same kind and the same number of resources are used as in conventional methods. The present embodiment is based on a more expanded way of thinking that recognizes the equality when the use amounts of the integrated resources converted into values (RQs) that do not depend on kinds of resources are the same even when different kinds and different number of resources are combined to be used.

The SDN controller 5 converts the total resource amount of an assignment candidate in the NW 3 into the total RQ amount, and computes the assigned RQ of each NSP from the total RQ amount. The SDN controller 5 computes the RQC from the requested resource amount of the service request, and, when the RQC is equal to or less than the remaining assigned RQ, accepts the communication service of the service request. As a result, the use efficiency of a resource in the NW 3 can be improved. In other words, because a decided path is not assigned and a resource is converted into RQ units to be assigned, and a requested resource of a service request is assigned within the range of an assigned RQ of an NSP, and thus the use efficiency of a resource in the NW 3 can be improved.

The SDN controller 5 is constituted of, for example, one computer, however, may be constituted of one or more computers.

The RQ assigning unit 24 sets, for example, "286" as the total RQ amount, "96" as the assigned RQ of the NSP-A, "95" as the assigned RQ of the NSP-B, and "95" as the assigned RQ of the NSP-C, and assigns all of the total RQ amount to the assigned RQs of the NSPs. However, the RQ assigning unit 24 may set "90" as the assigned RQ of the NSP-A, "90" as the assigned RQ of the NSP-B, and "90" as the assigned RQ of the NSP-C, and does not assign all of the total RQ amount to assign a part of the total RQ amount to the NSPs while leaving a margin. As a result, the probability of failure in a reservation of a resource for a service request can be reduced.

The RQ assigning unit 24 may set "286" as the total RQ amount, "100" as the assigned RQ of the NSP-A, "100" as the assigned RQ of the NSP-B, and "100" as the assigned RQ of the NSP-C, and the total of the RQs to be assigned to NSPs that exceed the total RQ amount may be assigned to the NSPs. As a result, even when all of the assigned RQ of the NSP is used, when much resource is not used in another NSP, the NSP can borrow the RQ of the another NSP, and can provide a service. Therefore, the probability of success in service provision to a user is improved as a total.

The RQ assigning unit 24 distributes the assigned RQ of the total RQ amount in accordance with contents of an enterprise contract between a network operator and an NSP. However, the assigned RQ may be fixedly distributed for each NSP. An assigned RQ of each NSP may be distributed regardless of contents of an enterprise contract.

The RQ converting unit 23 sets, for example, "RQ=1" for one 1-Gbps port, "RQ=1" for a used band of 1 Gbps, and "RQ=1" for one VM, as the reference rate of RQ. However, the setting of the reference rate may be appropriately changed, and may be decided by a network operator that possesses the facility of the NW 3.

For example, when the many nodes incorporate 1-Gbps ports and the few nodes incorporate 10-Gbps ports in the NW 3, the RQ of one 1-Gbps port may be set to be 0.5 and the RQ of one 10-Gbps port may be set to be 10. With respect to the actual unit price of the port, for example, the price of 10 Gbps×1 port is higher than the price of 1 Gbps×10 ports in some cases. Therefore, a network operator reflects the cost for acquiring the facility in the weight of the use of RQ to increase the RQ of a high-cost resource. As a result, the load of RQ when a specific NSP continues using a high-cost resource increases, and thus the turnover of the high-cost resource increases and opportunities of the use of resource become even.

For example, one VM is converted into "RQ=1", however, for example, may be converted into "RQ=2" when the performance of the general-purpose server in which the VM operates is high and into "RQ=1" when the performance of the general-purpose server is low. The RQ may be defined in accordance with the number of CPU cores to be assigned to one VM, the memory amount, a communication band that can be executed by using a port of the general-purpose server from a port of virtual communication of the VM (band control is executed for each VM by using virtual switch, etc. in general-purpose server in some cases). For example, when the number of CPU cores of one VM is one, the memory amount thereof is 2 Gbyte, and a communication band thereof is 1 Gbps, one VM may be converted into "RQ=1+2+1=4" in accordance with the number of CPU cores, the memory amount, and the communication band. The process ability and the price of a VM differ in accordance with a hardware configuration to be operated by the VM, and thus the cost is reflected in the weight of the use of RQ when the VM is operated in some performance to increase the RQ of the VM of high cost. As a result, the load of RQ when a specific NSP continues using the VM of high cost increases, and thus the turnover of the resource increases and opportunities of the use of resource become even.

The RQC converting unit 25 does not consider the number of hops between the user terminals 2 in the requested resource amount. However, the RQC corresponding to the band to be consumed may be add in accordance with the number of the hops, for example, in the example illustrated in FIG. 7, "0.5*2 (number of hops)=1.0". In this case, the RQC increases in accordance with the increase of the number of the hops, and thus the decrease amount of assigned RQ of NSP also increases. As a result, when the band resource is to be similarly used in the next service request, the remaining assigned RQ runs short, and thus the probability of denial of the service request becomes high. Therefore, because the further provision of service using a roundabout route can be suppressed, a vicious cycle of overconsuming of the band resource caused by a roundabout route can be avoided, and thus the wasteful consumption of a band resource can be reduced.

For example, when the RQC converting unit 25 detects a service request that specifies the upper limit (for example, 150 msec) of delay in end to end, candidates of usable ODU paths are narrowed in order to satisfy the upper limit of delay by using the route computing. The requested ensured band may be multiplied by the constant rate to convert into RQC in order to increase the RQ of the used band of an ODU path to satisfy the upper limit of delay. In the example illustrated in FIG. 7, "RQ=0.5 (used band)*1=0.5" may be multiplied by 1.5 as 150% to increase RQC as "RQC=0.5*1.5=0.75". The RQC to be consumed is large in a case of the upper limit of delay, and thus the decrease amount of assigned RQ of NSP is also large. As a result, even when the delay ensuring is to be similarly executed in the next service request, an assigned RQ runs short, and thus the probability of denial of the service request becomes high. Therefore, the turnover of the band resource becomes high among NSPs and opportunities of the use of resource become even.

In a case where the RQC converting unit 25 does not request ensuring of a used band, but requests the prior control of packets in the MPLS node, as a service request, the RQC converting unit 25 may multiply a constant rate corresponding to a prior class based on a transmission band of a port to convert into RQC. In the example illustrated in FIG. 7, when the prior class includes three classes of "high", "middle", and "low", "RQC=1" of the 1-Gbps port may be converted into 0.5 of 50% thereof in a case of the high class, may be converted into 0.3 of 30% thereof in a case of the middle class, and may be converted into 0.1 of 10% thereof in a case of the low class, as the RQC. Not being ensuring of a used band, because the prior control generates the difference between the use rates of the average band, when the RQC is weighted in accordance with the propriety, the equitability can be improved.

In a case where a request of ensuring a used band or the prior class does not exist as a service request, in other words, the connection is in best-effort, the communication traffic of a user does not flow depending on a crowded situation of the NW 3. Therefore, the RQC converting unit 25 converts the RQC into "0" regarding that a band resource is not exclusively consumed. However, the constant rate may be multiplied on the basis of a transmission band of a port to convert into the RQC. In the example illustrated in FIG. 7, "RQC=1" of a port of 1 Gbps may be converted into 0.05 as 5% thereof.

The determining unit 22 specifies an NSP by using a service request from the user terminal 2, refers to the customer information memory 42 of the specified NSP, and specifies the user. However, the determining unit 22 may include a user ID in a service request of the user terminal 2, and may specify the user and the NSP on the basis of the user ID.

In a case where the communication service of the service request is acceptable, the controller 28 may set setting information on each node on a path of a communication service, and stores path information in the path information memory 34 at the time of dynamically setting a path. In this case, the path information in the path information memory 34 can be updated dynamically.

The total RQ amount computing process illustrated in FIG. 10 executes processes of Steps S15, S16, and S17 considering the resource amounts of VMs. However, a system without VM may compute the total RQ amount by using the RQ of the candidate port+the RQ of the assignment candidate path in Step S17 without executing processes of Steps S15 and S16 not considering the resource amount of these VMs.

In addition, each component of each apparatus illustrated in the drawings is functionally conceptual, and thus, does not always physically configured as illustrated in the drawings. Namely, a specific mode of separation or integration of each apparatus is not limited to that illustrated in the drawings. That is, all or some of the components can be configured by separating or integrating them functionally or physically in any unit, according to various types of loads, the status of use, etc.

Furthermore, all or arbitrary ones of various types of processing functions to be executed by each device may be executed by a Central Processing Unit (CPU), a Digital Signal Processor (DSP), a Field Programmable Gate Array (FPGA), etc. The whole or arbitrary part of the various types of the processing functions may be executed by a program that is analyzed and executed by the CPU and the like, or hardware by the wired logic.

The region that stores various kinds of information may be constituted of a Read Only Memory (ROM), and a Random Access Memory (RAM) such as a Synchronous Dynamic Random Access Memory (SDRAM), a Magnetoresistive Random Access Memory (MRAM), and a Non Volatile Random Access Memory (NVRAM).

Figure 13:
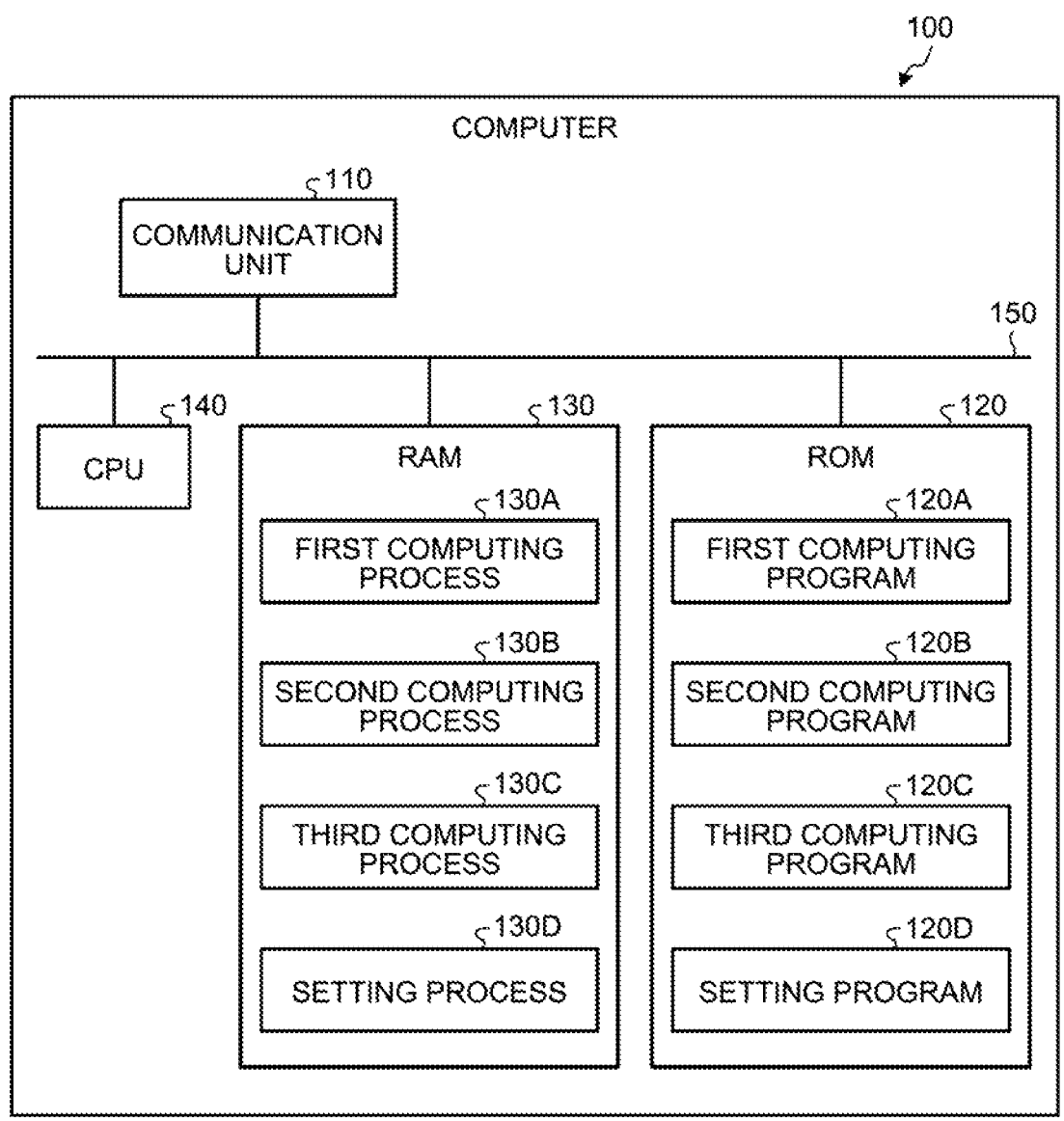
FIG. 13 is a diagram illustrating one example of a computer that executes a resource management program.

Meanwhile, various processes having explained in the present embodiment can be realized by execution of a preliminary prepared program caused by a processor such as a CPU in the computer. Hereinafter, one example of the computer that executes the program including a similar function to that of the aforementioned embodiment will be explained. FIG. 13 is a diagram illustrating one example of a computer that executes a resource management program.

A computer 100 illustrated in FIG. 13 that executes the resource management program includes a communication unit 110, a ROM 120, a RAM 130, a CPU 140, and a bus 150. The communication unit 110, the ROM 120, the RAM 130, and the CPU 140 are connected to each other via the bus 150. The communication unit 110 communicates with each communication device in the NW.

The ROM 120 preliminary stores the resource management program that exerts the similar function to that of the aforementioned embodiment. The ROM 120 stores a first computing program 120A, a second computing program 120B, a third computing program 120C, and a setting program 120D, as resource management programs. Moreover, the resource management program may be recorded, not in the ROM 120, but in a computer readable storing medium by using a drive (not illustrated). The storing medium may include a portable storing medium such as a CD-ROM, a DVD, and a USB memory, a semiconductor memory such as a flash memory, etc.

The CPU 140 reads the first computing program 120A from the ROM 120, and functions as a first computing process 130A on the RAM 130. Moreover, the CPU 140 reads the second computing program 120B from the ROM 120, and functions as a second computing process 130B on the RAM 130. The CPU 140 reads the third computing program 120C from the ROM 120, and functions as a third computing process 130C on the RAM 130. The CPU 140 reads the setting program 120D from the ROM 120, and functions as a setting process 130D on the RAM 130.

The CPU 140 provides a communication service in an NW in accordance with a service request. The CPU 140 converts the total resource amount in the NW into a first value. The CPU 140 assigns a second value from the first value for each type of the communication service. The CPU 140 converts the resource requesting amount of the service request into a third value. In a case where the third value is equal to or less than the second value that is assigned a type of the communication service of the service request, the CPU 140 sets the communication service that is associated with the service request for a communication device on the NW. As a result, the use efficiency of the resource in the NW can be improved.

According to an aspect of the embodiment, it is possible to improve the use efficiency of resources in an NW.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A resource management device that provides a communication service in a network in response to a service request, the resource management device comprising a processor, wherein the processor executes a process comprising:
    first converting a total resource amount in the network into a first value that is a first converted result of a total amount converted by using a predetermined reference rate, the total resource amount including a transmission band amount of a communication path that is set between communication devices on the network and a number of ports of each type of a transmission band among ports of the communication devices, which are connectable with a terminal device associated with the service request;
    assigning a second value to each type of the communication service from the first value, the second value that is a second converted result of an assigned resource amount converted by using the predetermined reference rate;
    second converting a resource requesting amount of the service request into a third value that is a third converted result of a requested amount of a service request converted by using the predetermined reference rate, the resource requesting amount including a service quality between start and end points that are associated with the communication service of the service request;
    setting, determining the third value is equal to or less than the second value that is assigned to the type of the communication service of the service request, a communication service associated with the service request for a communication device on the network; and adjusting the second value of another communication service to adjust a shortage amount of the second value of the communication service, determining the third value is greater than the second value of the communication service of the service request.

2. The resource management device according to claim 1, wherein
the first converting includes converting, determining the communication device includes at least one Virtual Network Function (VNF) that operates in a server on the network, the total resource amount that includes a number of the VNFs into the first value, and
the second converting includes converting the resource requesting amount that includes the number of the VNFs into the third value.

3. The resource management device according to claim 2, wherein
the first converting includes converting into the first value the total resource amount that includes a number of processors, a memory amount, and a communication band, which are assigned to the at least one VNF, instead of the number of the VNFs, and
the second converting includes converting into the third value the resource requesting amount that includes the number of the processors, the memory amount, and the communication band, which are assigned to the at least one VNF, instead of the number of the VNFs.

4. A resource management system that is a communication system including a plurality of communication devices in a network and a resource management device providing a communication service in response to a service request by using the communication devices in the network, the resource management device comprising a processor, wherein the processor executes a process comprising:
first converting a total resource amount in the network into a first value that is a first converted result of a total amount converted by using a predetermined reference rate, the total resource amount including a transmission band amount of a communication path that is set between communication devices on the network and a number of ports of each type of a transmission band among ports of the communication devices, which are connectable with a terminal device associated with the service request;
assigning a second value to each type of the communication service from the first value, the second value that is a second converted result of an assigned resource amount converted by using the predetermined reference rate;
second converting a resource requesting amount of the service request into a third value that is a third converted result of a requested amount of a service request converted by using the predetermined reference rate, the resource requesting amount including a service quality between start and end points that are associated with the communication service of the service request;
setting, determining the third value is equal to or less than the second value that is assigned to the type of the communication service of the service request, a communication service associated with the service request for the communication device on the network; and
adjusting the second value of another communication service to adjust a shortage amount of the second value of the communication service, determining the third value is greater than the second value of the communication service of the service request.

5. A non-transitory computer-readable recording medium having stored therein a resource management program that causes a processor of a resource management device that provides a communication service in a network in response to a service request to execute a process, the process comprising:
first converting a total resource amount in the network into a first value that is a first converted result of a total amount converted by using a predetermined reference rate, the total resource amount including a transmission band amount of a communication path that is set between communication devices on the network and a number of ports of each type of a transmission band among ports of the communication devices, which are connectable with a terminal device associated with the service request;
assigning a second value to each type of the communication service from the first value, the second value that is a second converted result of an assigned resource amount converted by using the predetermined reference rate;
second converting a resource requesting amount of the service request into a third value that is a third converted result of a requested amount of a service request converted by using the predetermined reference rate, the resource requesting amount including a service quality between start and end points that are associated with the communication service of the service request;
setting, determining the third value is equal to or less than the second value that is assigned to the type of the communication service of the service request, a communication service associated with the service request for a communication device on the network; and
adjusting the second value of another communication service to adjust a shortage amount of the second value of the communication service, determining the third value is greater than the second value of the communication service of the service request.

* * * * *